United States Patent
Ribechini

(10) Patent No.: US 7,506,266 B1
(45) Date of Patent: Mar. 17, 2009

(54) SYSTEM AND METHOD FOR CUSTOMIZING COLLAPSE FEATURE FOR EDITORS

(75) Inventor: Fausto Ribechini, Rome (IT)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,542

(22) Filed: Jan. 27, 2008

(51) Int. Cl.
*G06F 17/00* (2006.01)

(52) U.S. Cl. .................. 715/764; 715/234; 717/108

(58) Field of Classification Search .......... 715/764–802
See application file for complete search history.

(56) References Cited

U.S. PATENT DOCUMENTS

| | | | |
|---|---|---|---|
| 5,764,226 A | 6/1998 | Consolatti et al. | |
| 7,051,316 B2 * | 5/2006 | Charisius et al. | 717/103 |
| 7,086,002 B2 | 8/2006 | Elo et al. | |
| 2002/0184610 A1 * | 12/2002 | Chong et al. | 717/109 |
| 2003/0164957 A1 | 9/2003 | Komaki | |
| 2003/0231205 A1 | 12/2003 | Shima et al. | |
| 2004/0041818 A1 | 3/2004 | White et al. | |

FOREIGN PATENT DOCUMENTS

WO  WO 0244947 A2  6/2002

OTHER PUBLICATIONS

"Enhancing CS Programming Lab Courses Using Collaborative Editors", by Timothy J. Hickey et al, Published 2004, MA, US pp. 157-167.*
"Presentations by Programmers for Programmers", by Li-Te Cheng et al, Published 2007 by IEEE, pp. 1-4.*

* cited by examiner

*Primary Examiner*—Doug Hutton
*Assistant Examiner*—Quoc A Tran
(74) *Attorney, Agent, or Firm*—MaxValueIP, LLC

(57) ABSTRACT

Document editors have the ability to collapse or expand some part of a file content they are viewing (as an example). However, the few editors that already provide such a feature only provide it for a particular file type or using reserved language words. However, this system (as an example) makes the Collapse/Expand feature available to any file, while it accords strictly to the piece of text the user is writing. Thus, the Collapse/Expand feature might be bound and transferable with any paragraph of the file. A user is able to choose the delimiters of such a collapse action according to its own style and the document type.

1 Claim, 1 Drawing Sheet

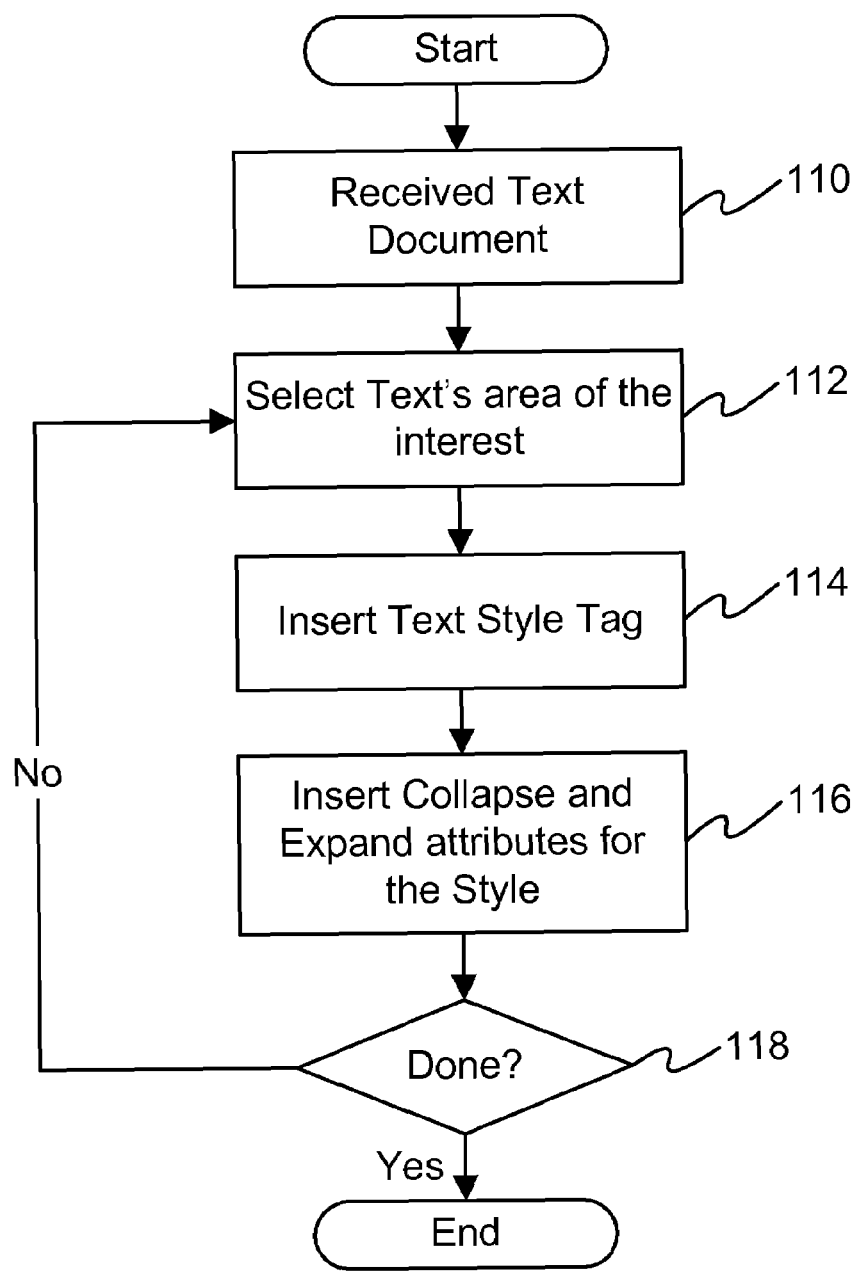

SYSTEM AND METHOD FOR CUSTOMIZING COLLAPSE FEATURE FOR EDITORS

BACKGROUND OF THE INVENTION

When creating complex and long document, the drafter may need to check the structure of the document in an independent way from its contents. It is also helpful to have the ability to hide part of the document when complete in order to focus on portions still in progress. Such feature provides users with the ability to focus on part of the document and speed up any search and find task. This also gives the user the ability to better analyze the writing/content by checking it through different views.

The existing expand/collapse feature allows a user to hide part of the text in a way that the user can see and concentrate only on the part of immediate interest. This feature is available on many tools rendering text such as the operating system tools to show the tree of directories, integrated development environment tools, and email writing pads.

However, with all these tools, this feature is limited in the way it is applied: First, the feature is applied to very specific text with some semantic meaning. The text allowed to be collapsed is recognized for its purpose, e.g. as representation of directories or a piece of code within specific tags in some specific language; or in the other way it must be selected by the user and marked from the beginning to the end.

Second, either any collapse specification (e.g., start point, end point, and resuming words) is specific to the tool used and the user cannot have its own choices, or in case of marked selections, the choices must be defined any time is used for any different text. In other words, this feature is strictly bound with both the tool used and with the text processed.

SUMMARY OF THE INVENTION

Document editors have the ability to collapse or expand some part of a file content they are viewing (as an example). However, the few editors that already provide such a feature only provide it for a particular file type. For instance some IDE editors provide the ability to collapse/expand code in case it is contained among some language reserved words.

However, one embodiment of this system makes the Collapse/Expand feature available to any file, while it accords strictly to the piece of text the user is writing. Thus, the Collapse/Expand feature might be bound and transferable with any paragraph of the file. A user is able to choose the delimiters of such a collapse action according to its own style and the document type. The way in which contents might collapse might also differ inside the same text according to the paragraph contents.

BRIEF DESCRIPTION OF THE DRAWINGS

The FIGURE (FIG. 1) is the flow diagram of inserting collapse/expand feature in a typical editor.

DETAILED DESCRIPTION OF THE PREFERRED EMBODIMENTS

One embodiment of this system makes the collapse/expand feature of editors more general, flexible and customizable (as an example). When a paragraph style is defined, the user may enter delimiters for text and the editor should become able to collapse/expand text included in those delimiters when the paragraph is used.

By making such attribute choices part of the paragraph definition, the delimiters can be used with any editor. At the same time, the document properties should include and record any eventual needed starting and ending point for collapse sections independent of general paragraph delimiters.

An advantage of this technique (as an example) is in the flexibility introduced to read and format the text, which will be interchangeable between text editors. It is not just tagging or text formatting as is a dynamic management of the text itself.

The proposed system's approach (as an example) is to abstract the collapse/expand feature and to make it an additional specification/option in the formatting style used to display the text. When rendering a text, a style is applied to determine attributes such as fonts, margins and indenting tabs.

One embodiment of this system enriches the format of the paragraph with a section defining the collapse/expand configuration and providing user a method to define a general and customizable way to use this feature according to the user needs and taste.

This method (as an example) makes the collapse/expand feature independent of the text that is being processed. The collapse/expand feature might be applied together with other formatting options to any text according to the applied style. If, for instance, the user creates a style for poetry, the user might configure the style to collapse/expand any stanza. While the same text may be displayed when applying a style with collapsing/expanding feature set according to citation starting points.

This system (as an example) enables the user to collapse/expand any particular text without regard to the nature of the text; i.e. the same enhanced style (with collapse/expand entries) is applied the same way to text whether the text is code or poetry stanzas.

In addition, style moves with and accompanies text, therefore, the users will be able to apply their customized collapse/expand choices and manage text as they wish everywhere that it is applied (i.e. the feature is not tied to a particular tool) thereby giving the users freedom to apply their own preferred collapse/expand enhanced formatting style.

Another embodiment of this system is comprised of:

Receiving a text file, assigning one or more style formats to multiple portions of the received text file and assigning multiple text display collapse and expand attributes to this one or more style formats.

Collapsing a first one of the multiple portions of the text file, based on a first one of the multiple text display collapse and expand attributes that corresponds to the first one of the multiple portions of the text file.

Expanding a second one of the multiple portions of the text file, based on a second one of the multiple text display collapse and expand attributes that corresponds to the second one of the multiple portions of the text file.

Searching a third one of the multiple portions of the text file, based on the multiple text display collapse and expand attributes and based on a state of the third one of the multiple portions of the text file, with respect to collapsing state or expanding state.

Another embodiment of this system is depicted in the FIGURE (FIG. 1). As the text document is received by the user (Step 110), user selects the area of the text that must be formatted (Step 112), user inserts the style tag or attribute to the selected text area (Step 114), user then inserts collapse and expand attributes for the style to this area of the text (Step 116).

If the formatting of the text file is complete (Step 118) the process ends. If the formatting of the text file is not complete, user selects another area of the text (Step 112) and steps 114, 116 and 118 continues until the entire text file is marked and formatted.

Another embodiment of this system could be that user defines style files and inside each style file, inserts the collapse and expand attributes. While editing the text documents as referenced in the FIGURE (FIG. 1), style file reference is inserted for each area of the text file which contains the collapse and expand attributes.

An advantage of this technique (as an example) is that attributes could be modified in its own files without changing the original text file.

A system, apparatus, or device comprising one of the following items is an example of the invention: editing software, editing tool, editing computer, editor, editing on computer screen, server, client device, PDA, mobile device, cell phone, storage to store the edited text or data, router, switches, network, communication media, cables, fiber optics, physical layer, buffer, nodes, packet switches, computer monitor, or any display device, applying the method mentioned above, for purpose of editing or document management. Any variations of the above teaching are also intended to be covered by this patent application.

The invention claimed is:

1. A method of customizing a collapse feature in multiple text editors within an integrated development environment, said method comprising:

receiving a text file in one of said text editors of said integrated development environment;

assigning one or more paragraph style formats to multiple portions of said text file, wherein said one or more paragraph style formats determine one or more style attributes, said one or more style attributes comprise fonts, margins and indenting tabs for rendering said text file when applying said one or more paragraph style formats;

choosing by a user delimiters of multiple text display collapse and expand attributes;

assigning said multiple text display collapse and expand attributes to said one or more paragraph style formats; wherein said one or more paragraph style formats are interchangeable between different text editors, within the IDE and said multiple text display collapse and expand attributes are bound and transferable with any portion of said text file; and performing a focused search and find task, said focused search and find task comprising:

collapsing a first portion of said multiple portions of said text file, based on a first one of said multiple text display collapse and expand attributes that corresponds to said first portion of said multiple portions of said text file;

expanding a second portion of said multiple portions of said text file, based on a second one of said multiple text display collapse and expand attributes that corresponds to said second portion of said multiple portions of said text file; and searching said second portion among said multiple portions of said text file.

* * * * *